United States Patent [19]

Buckler

[11] 4,250,634

[45] Feb. 17, 1981

[54] SONOBUOY SIMULATOR DEVICE

[75] Inventor: Lawrence A. Buckler, Dartmouth, Canada

[73] Assignee: Her Majesty the Queen in right of Canada, as represented by the Minister of National Defence, Ottawa, Canada

[21] Appl. No.: 844,507

[22] Filed: Oct. 18, 1977

[30] Foreign Application Priority Data

Jun. 17, 1977 [CA] Canada .................................. 280743

[51] Int. Cl.³ .............................................. G09B 9/00
[52] U.S. Cl. .......................................... 434/6; 367/13; 367/87
[58] Field of Search ........................................ 35/10.4

[56] References Cited

U.S. PATENT DOCUMENTS

| 2,881,535 | 4/1959 | Harwood et al. ..................... 35/10.4 |
| 3,008,244 | 11/1961 | Lindley, Jr. ......................... 35/10.4 |
| 3,713,081 | 1/1973 | Murphree ............................ 35/10.4 |
| 3,936,958 | 2/1976 | Clapsaddle ......................... 35/10.4 |

Primary Examiner—Richard A. Farley
Attorney, Agent, or Firm—Stevens, Davis, Miller & Mosher

[57] ABSTRACT

The invention relates to a simulator for providing waveforms of the type produced at a receiver from a sonobuoy transmission. The simulator signal includes a component representing reverberation under different sea state conditions and a component representing echo pulses received from a target having relative motion with respect to the sonobuoy. Selected initial range and target speed values can be set in the simulator so that the signal includes a sequence of echo pulses having the varying delay and doppler shift which would occur from a target starting at the selected range and moving at the selected speed.

13 Claims, 19 Drawing Figures

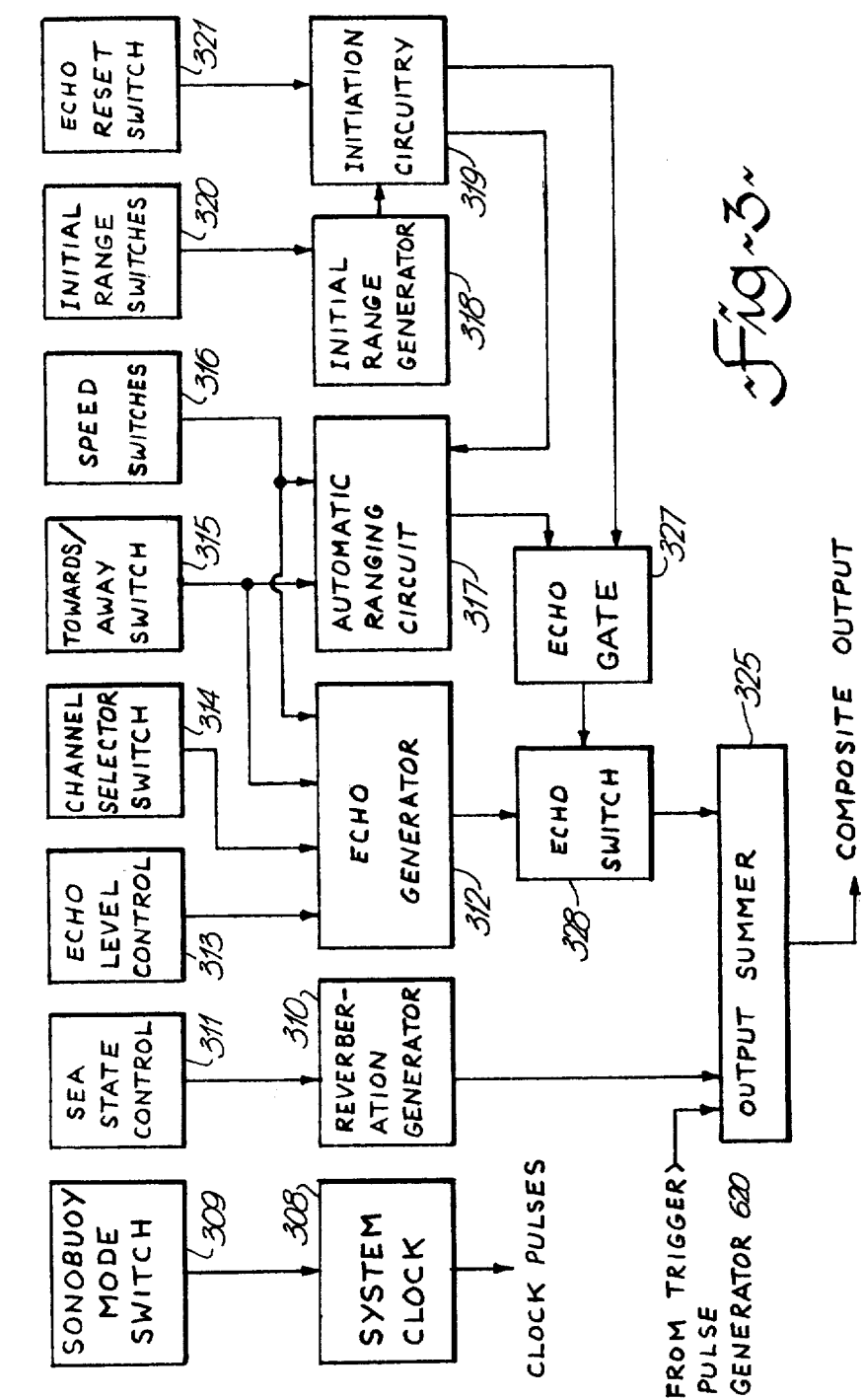

| DEVICE NAME | DEVICE SYMBOL | TRUTH TABLE |
|---|---|---|
| INVERTER | 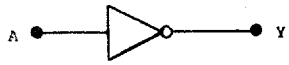 | A \| Y<br>0 \| 1<br>1 \| 0 |
| AND GATE | 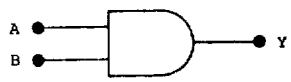 | A \| B \| Y<br>0 \| 0 \| 0<br>0 \| 1 \| 0<br>1 \| 0 \| 0<br>1 \| 1 \| 1 |
| OR GATE |  | A \| B \| Y<br>0 \| 0 \| 0<br>0 \| 1 \| 1<br>1 \| 0 \| 1<br>1 \| 1 \| 1 |
| NAND GATE | 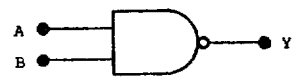 | A \| B \| Y<br>0 \| 0 \| 1<br>0 \| 1 \| 1<br>1 \| 0 \| 1<br>1 \| 1 \| 0 |
| NOR GATE |  | A \| B \| Y<br>0 \| 0 \| 1<br>0 \| 1 \| 0<br>1 \| 0 \| 0<br>1 \| 1 \| 0 |
| EXCLUSIVE-OR GATE |  | A \| B \| Y<br>0 \| 0 \| 0<br>0 \| 1 \| 1<br>1 \| 0 \| 1<br>1 \| 1 \| 0 |
*Fig-12*

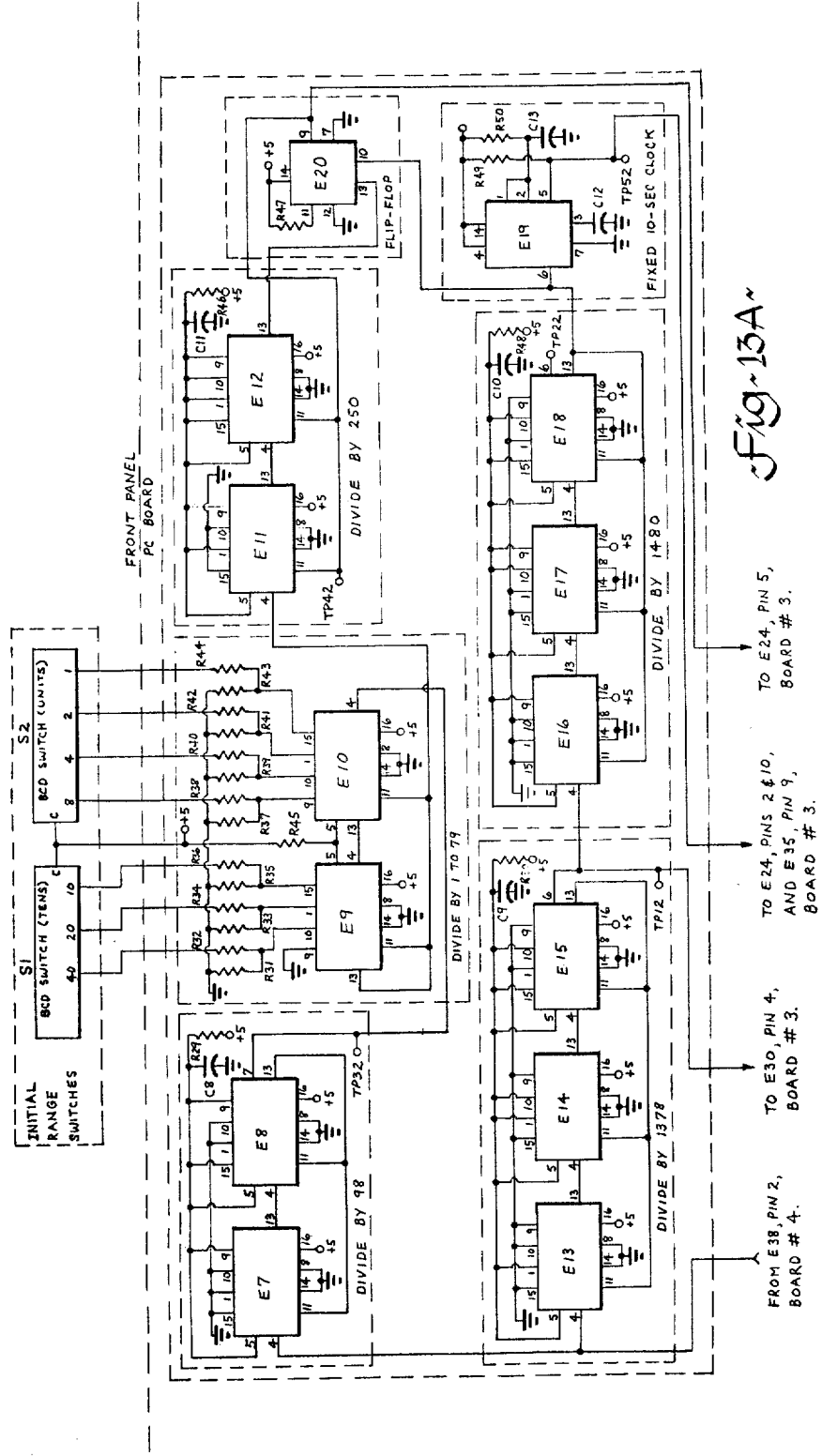

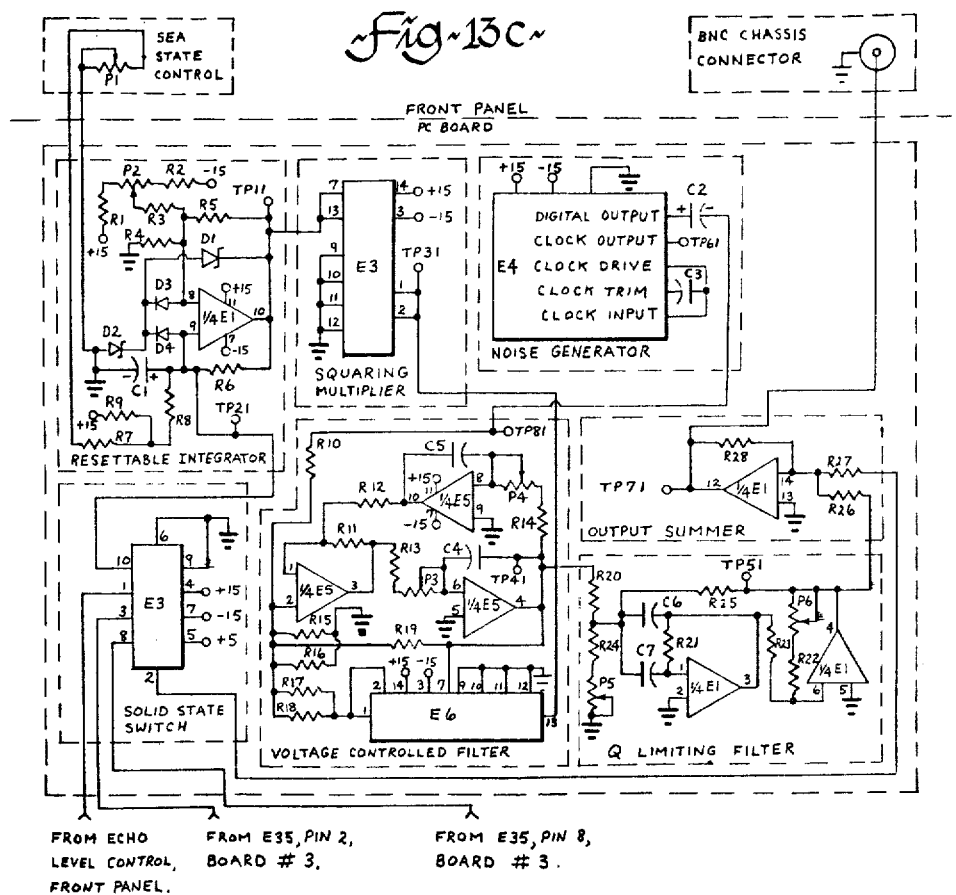

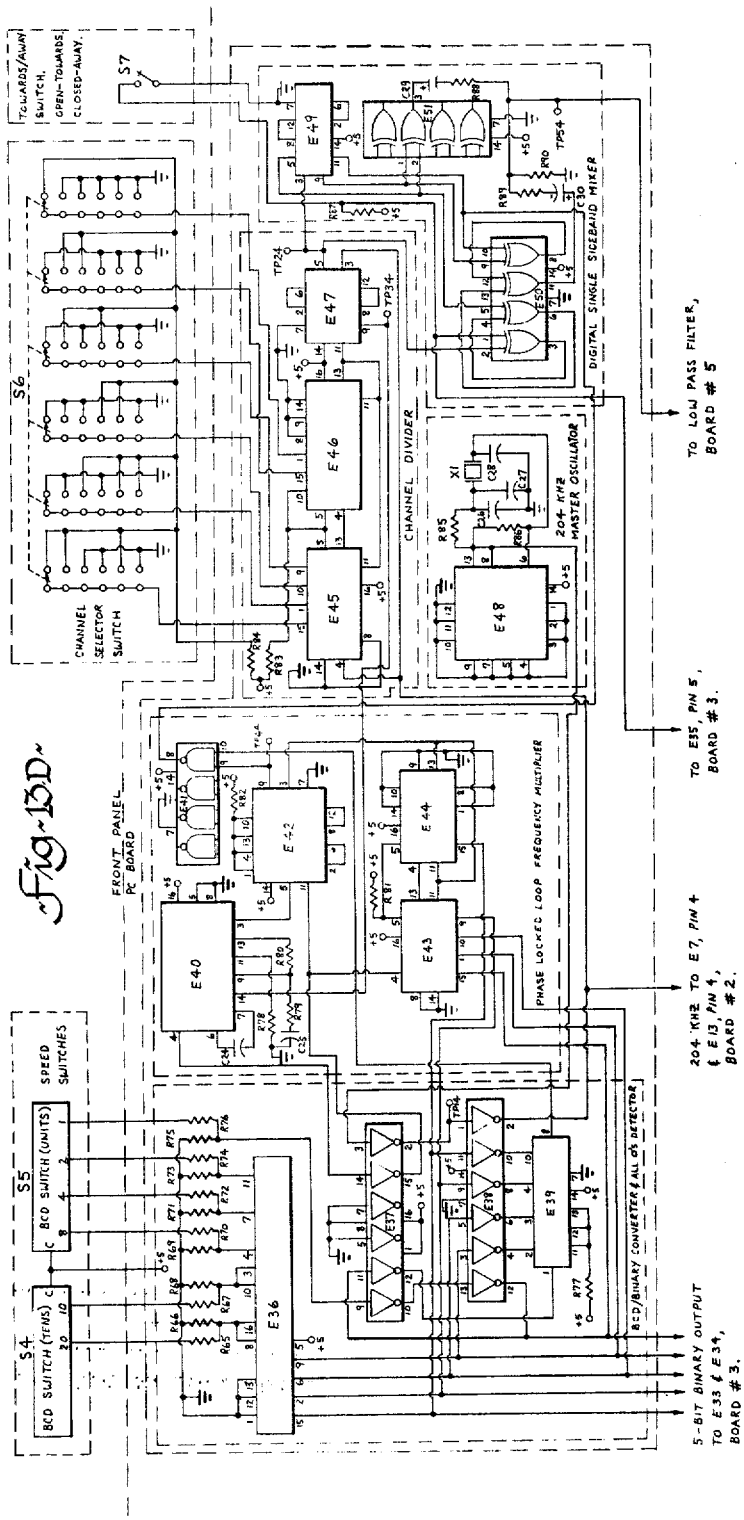

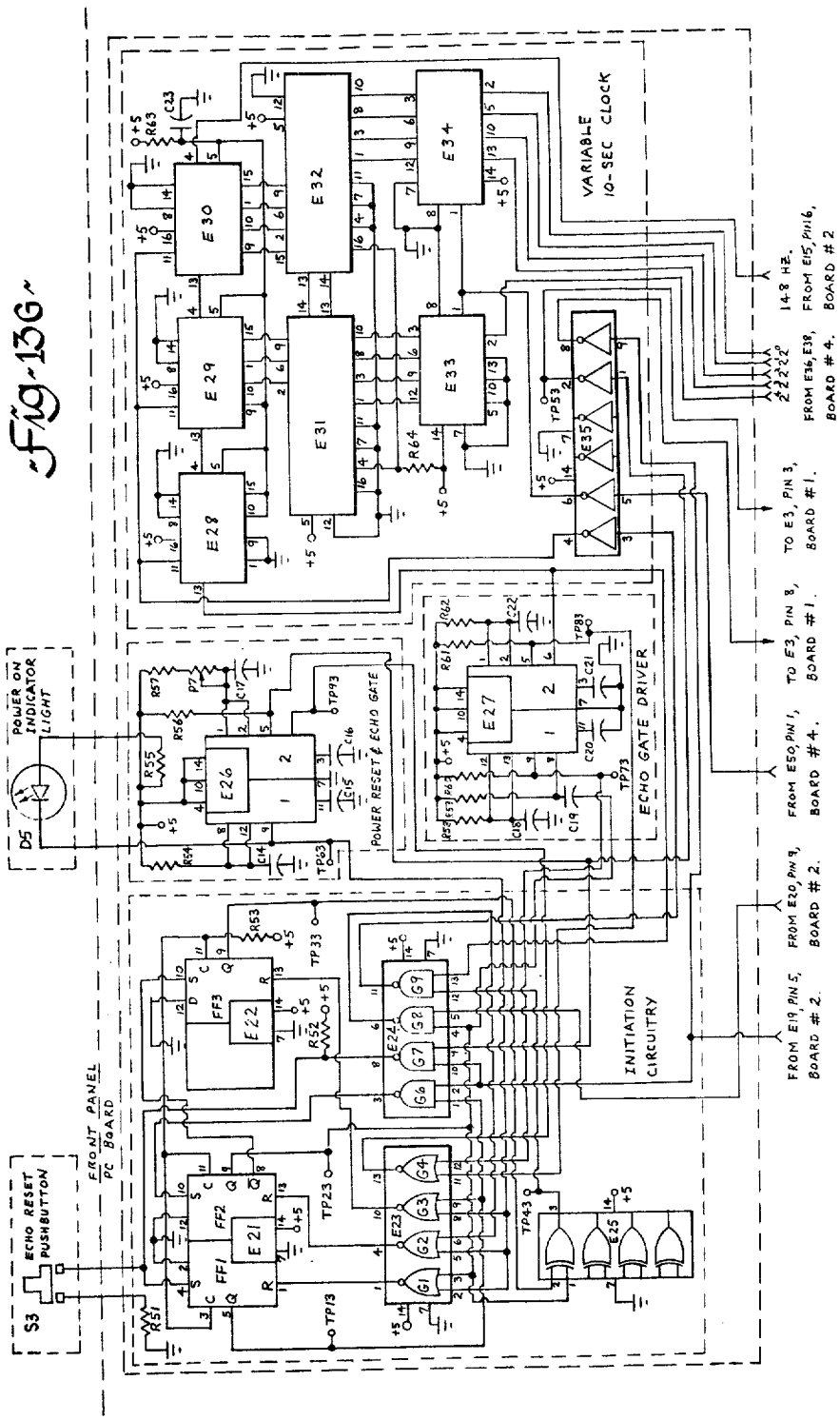

//4,250,634

SONOBUOY SIMULATOR DEVICE

This invention relates to a simulator for providing waveforms of the type produced at a receiver from the signal transmitted by a sonobuoy. Such a waveform contains a trigger pulse and has components representing received reverberation noise and target echoes. The target echo component is subject to varying delay and doppler shift depending on the range and speed of the target. In practice this waveform is heterodyned to a center frequency of 850 Hz and transmitted on the VHF carrier of the sonobuoy. The signal is demodulated in the receiver to produce the composite waveform.

Clearly, training exercises involving the use of sonobuoys are complex and expensive in that they involve not only an aircraft and several sonobuoys, but also the necessity of providing an appropriate target for the sonobuoys. It has been known to provide tape recordings of sonar signals and use these recordings for training purposes. This suffers from the disadvantages that information on the tapes is fixed and thereby lacks the flexibility required for training purposes and after the tapes have been played back a few times, familiarity with the information contained on them makes them ineffective for further training. By providing the simulator of the present invention considerable expense can be avoided and a significant amount of additional training can be supplied for operators of the equipment.

The present invention relates to a sonobuoy pulse simulator comprising means producing a train of simulated reverberation signals, means setting target representative range, speed and direction signals, means responsive to the signals to provide a train of simulated echo pulses, and summing means combining the reverberation signals and echo pulses. An automatic ranging means for varying the timing of the echo pulses is optionally provided for simulating movement of a target relative to a sonobuoy. The simulator is preferably constructed using digital hardware in critical timing circuits and a stable master oscillator thereby eliminating requirements for periodic calibration adjustments.

In another aspect the invention relates to a circuit for producing a simulated echo signal received from a target moving at a selected speed interrogated by a pulse of selected frequency. A reference signal is frequency divided to produce a first signal representative of the selected frequency of the pulse. A second signal is provided representative of target speed. Multiplying means responsive to said first and second signals provide a third signal representative of the product of target speed and the selected frequency. Modulating means mix the reference signal and the third signal to extract a sideband signal therefrom. Frequency dividing means is provided responsive to the sideband signal to produce the simulated echo signal.

BRIEF DESCRIPTION OF THE DRAWINGS

FIG. 3 is a block diagram of the overall arrangement of the simulator;

FIG. 11 is a diagram showing the operation of the logic circuits in the control circuitry of FIG. 10;

FIG. 12 defines the operation of the gates shown in FIG. 10;

FIGS. 13(a)-13(g) are detailed circuit schematics of one embodiment of the simulator.

DESCRIPTION OF THE PREFERRED EMBODIMENT

Figure 1:
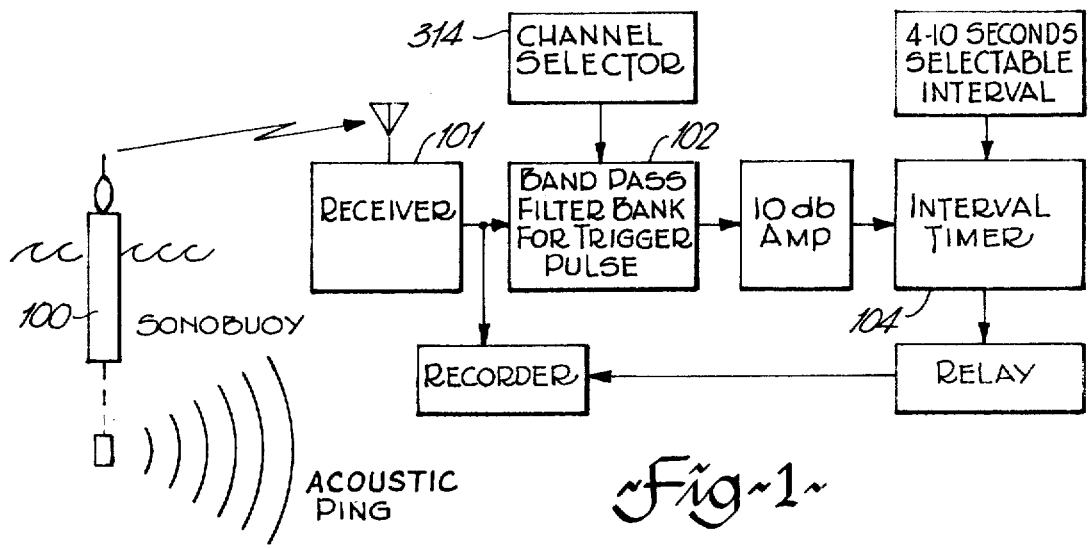
FIG. 1 illustrates a typical sonobuoy system producing a signal of the type to be simulated.
Figure 2:
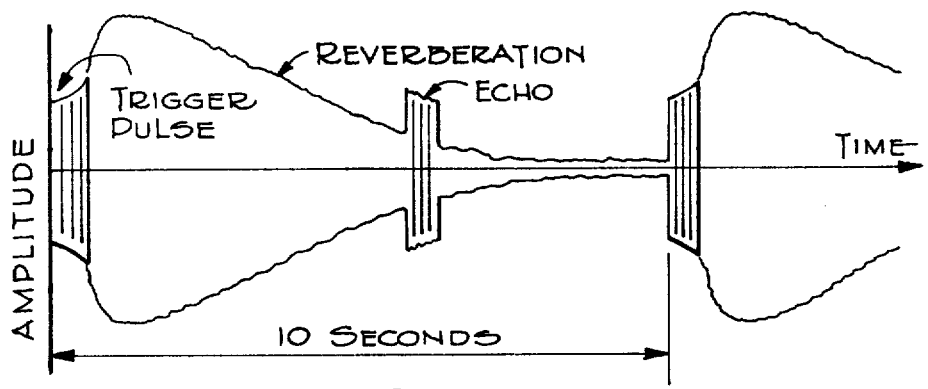
FIG. 2 is the envelope of a typical simulated signal.

FIG. 1 illustrates the system which is to be simulated. A sonobuoy 100 transmits an acoustic pulse, simultaneously generating a trigger pulse of twice the sonobuoy channel acoustic frequency which modulates the VHF transmitter of the sonobuoy. Following the trigger pulse, the received reverberation noise and target echoes are heterodyned to a center frequency of 850 Hz and transmitted on the VHF carrier of the sonobuoy. These signals are subsequently demodulated in the receiver 101 to produce the composite waveform envelope shown in FIG. 2.

As shown in FIG. 1, the demodulated trigger pulse is selected by the appropriate bandpass filter 102 whose center frequency is dependent on the sonobuoy channel selected. It is amplified and then applied to a manually selectable 4 to 10 second interval timer 104. This interval timer is triggered by the first pulse it receives and causes a relay to actuate the recorder paper drive motor. At the completion of the preselected time interval, the timer de-energizes the relay and the paper drive motor stops until the next trigger pulse is received, when the sequence is repeated.

FIG. 3 shows the overall organization of the simulator of this invention. System clock 308 controlled by sonobuoy mode switch 309 (described in greater detail in connection with FIG. 4) sets the simulated acoustic pulse repetition rate. A reverberation generator 310 (described in greater detail in connection with FIGS. 5 and 6) produces the reverberation component of the composite waveform. The shape of this component is controlled by a sea state control 311. An echo generator 312 (described in greater detail in connection with FIG. 7) provides the echo signal. The characteristics of this signal are responsive to an echo level control 313, a channel selector switch 314 giving the appropriate acoustic interrogation frequency, a towards/away switch 315 setting assumed target motion and speed switches 316 giving the assumed velocity of the target. An automatic ranging circuit 317 is provided (described in greater detail in connection with FIG. 9) which gives the variation in echo pulse delay from transmitted acoustic pulse due to assumed target movement. Initial range generator 318 (described in greater detail in connection with FIG. 8) sets the time of occurrence of the first echo pulse under the control of initiation circuitry 319 which, in turn, controls an echo gate circuit controlling an echo switch 328. The control circuit or initiation circuit is described in greater detail in connection with FIG. 10. The initial range is set by switches 320 and the operation of the echo generation circuitry of the apparatus is initiated by an echo reset switch 321. The various components of the signal are supplied to a summing circuit 325 to give the composite output.

SYSTEM CLOCK

Figure 4:
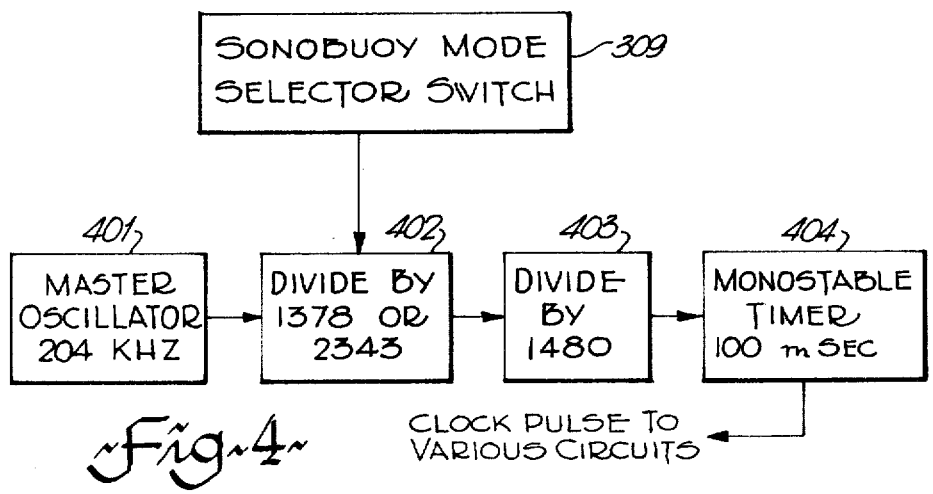
FIG. 4 is a block diagram of the system clock section of the simulator.

The purpose of the system clock is to provide pulses at a repetition rate representative of the acoustic pulse repetition rate of an actual sonobuoy. FIG. 4 is a block diagram of the organization of the system clock. A 204 kHz master oscillator 401 is first divided down in divider 402 by 1378 or 2343, as selected by the sonobuoy mode selector switch 309, to produce a lower frequency. This low frequency is further divided down in divider 403 by 1480 to produce pulses at an even lower frequency. These pulses are set to a standard width of 110 m sec by monostable timer 404. The resulting system clock pulses are used to control various circuits within the simulator. When the sonobuoy mode selector switch 309 is in the SSQ-47 position, a 110 m sec clock pulse is produced every 10 seconds; when it is in the SSQ-552 position, a 110 m sec clock pulse is produced every 17 seconds.

Figure 13B:
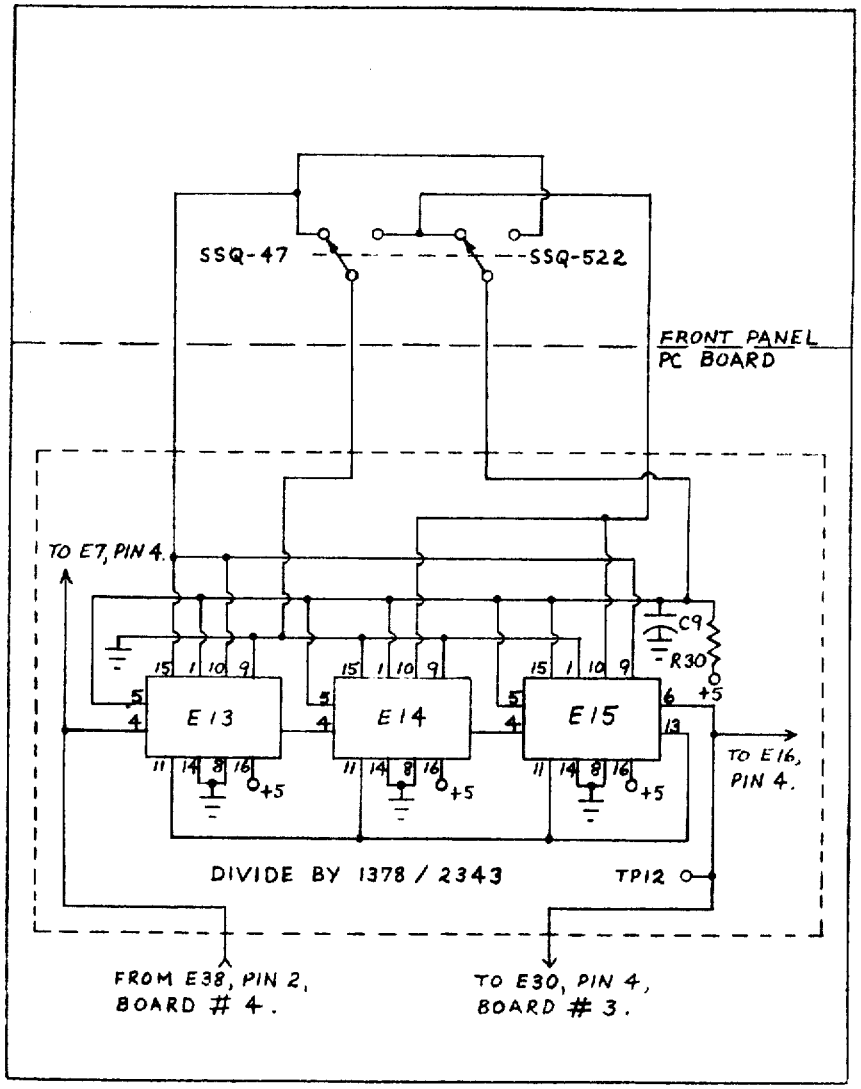

The range of division possible in divider 402 is from 1 to 4095. This makes possible simulated ping-to-ping intervals from monostable timer 404 ranging from virtually zero to about 30 seconds. The chosen values of 10 and 17 seconds are representative of existing sonobuoys. Simulator operation is equally valid for either ping interval value. FIG. 13(a) shows in detail a circuit diagram of a typical 10 second clock while FIG. 13(b) shows the modification required to obtain a clock of either 10 or 17 seconds period. To avoid repetitious explanations, subsequent circuit descriptions assume mode selector switch 309 in the SSQ-47 position resulting in simulated acoustic interrogation pulses every 10 seconds.

REVERBERATION GENERATOR

Figure 6:
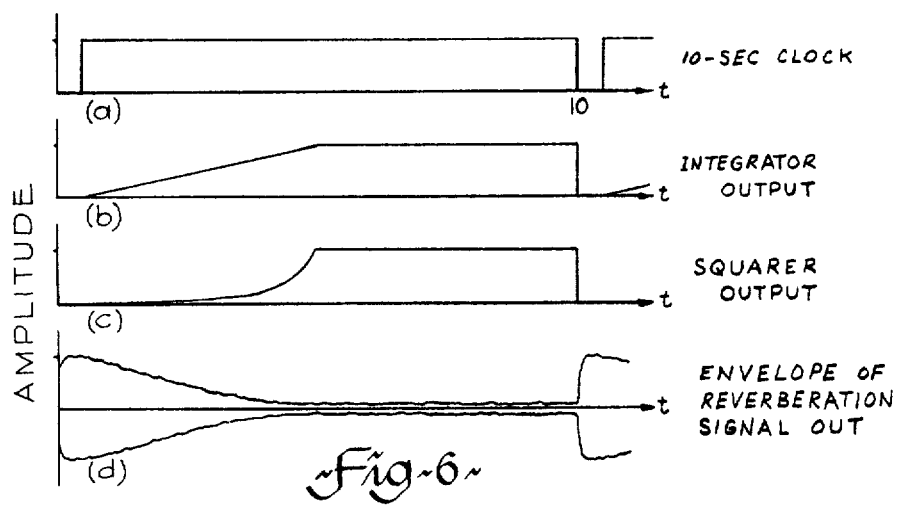
FIG. 6 shows waveforms occurring in the reverberation generator.
Figure 5:
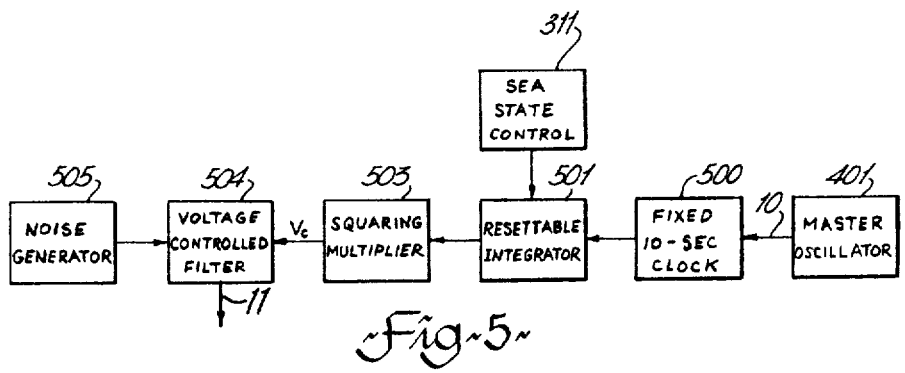
FIG. 5 is a block diagram of the reverberation generator section of the simulator.

FIG. 5 is a block diagram showing the organization of the reverberation generator and FIG. 6 shows waveforms occuring in the circuit. The basic master oscillator signal on line 10 is supplied to divider 500 where it is divided down to provide a clock pulse every 10-seconds as previously described. The clock repetition rate simulates the transmission rate of a sonobuoy. The clock pulses are fed to integrator 501 to reset its output to zero at the occurrence of each clock pulse. Sea state control 311 provides an adjustable DC voltage to the input of the integrator. At the end of the reset period, the integrator begins to integrate the DC voltage and thus produce a ramp voltage, waveform (b) of FIG. 6; slope is set by the sea state control. This ramp is fed to squaring multiplier 503 used as a squaring circuit, to produce a voltage, $V_c$, which is used as the control voltage applied to a voltage-controlled filter 504. Filter 504 is a bandpass filter, centered at 850 Hz. having a Q decreasing with increasing control voltage. That is, the peak response decreases and the bandwidth widens with increasing control voltage. The other input to filter 504 is random noise from a noise generator 505. The output signal appearing on lead 11 simulates the reverberation component in a received sonobuoy signal.

FIG. 6(a) shows the periodic 10-second clock pulse and FIG. 6(b) the integrator output, commencing at the end of each clock pulse. As stated above, the slope of the ramp is dependent on the DC voltage produced by the sea state control 311. FIG. 6(c) shows the squaring multiplier output and FIG. 6(d) the resulting envelope of the simulated reverberation signal component produced by the narrow band noise passing through voltage-controlled filter 504. A square law control voltage is used because the Q of the filter is most sensitive to change in control voltage near zero volts. As a result, the filtered noise in the output decreases with time, as the bandwidth increases, resulting in the production of a realistic simulated reverberation signal component. FIG. 13(c) shows in detail a circuit diagram of a typical reverberation generator constructed in accordance with the present invention.

ECHO GENERATOR

The problem to be solved in devising an echo generator is to simulate the type of echo signal at a frequency centered around 850 Hz as received at a receiver remote from the sonobuoy. Since the target is moving, there will be a doppler frequency contribution in the received echo frequency which is dependent both on acoustic interrogation frequency and target speed and direction. Specifically the frequency of an echo, $f_{echo}$, in a typical system is given by $$f_{echo} = (850 \pm \frac{2Vf_s}{C}) Hz$$

where
V = target speed relative to the receiving hydrophone
$f_s$ = acoustic interrogation frequency
C = speed of sound in water,
For example, assuming a speed of 1 knot (1.689 ft/sec), $f_s$ = 13 kHz (Channel 2) and C = 5000 ft/sec, $$f_{echo} = (850 \pm 8.78) Hz.$$

Hence, under these conditions, $f_{echo}$ = 858.78 Hz for the target moving towards, or 841.22 Hz for it moving away from the sonobuoy.

Figure 7:
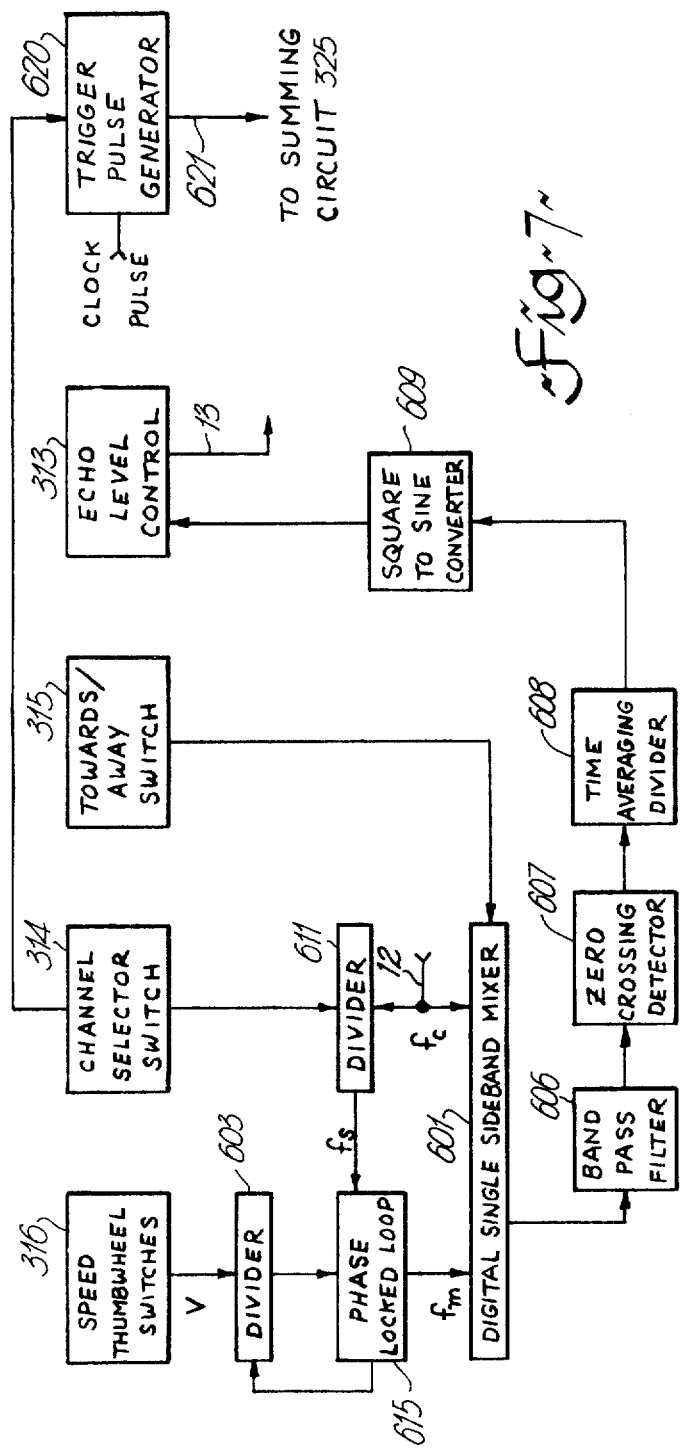
FIG. 7 is a block diagram of the echo pulse generator and trigger pulse sections of the simulator.

FIG. 7 is a block diagram showing the organization of the echo generator. The basic component is a digital single sideband mixer 601. A fixed carrier signal, $f_c$ supplied on line 12, and a variable modulating frequency, $f_m$, derived from this carrier signal are supplied to the input of the 601. Toward/away switch 315 determines whether the output will be the upper or lower sideband, depending on whether the target is travelling towards or away from the sonobuoy. The frequency of the modulating signal, $f_m$, is determined from the settings of the speed and channel switches 316 and 314 and thus contains the doppler information. Channel selector switch 314 selects the number by which the carrier frequency is divided down in a divider 611 to produce a signal at an equivalent channel frequency, $f_s$. This signal is then multiplied in the phase locked loop multiplier circuit 615 by the number selected by the speed switches, to give an output frequency of $f_m = V f_s$. The speed switches 316 control the setting of divider 603 to establish the target speed information in the phase locked loop.

The output of the single sideband mixer 601 contains components other than the wanted sideband $(f_c \pm f_m)/2$ and these are reduced but not entirely eliminated by a bandpass filter 606. The unwanted sidebands may cause a variation in the time interval between axis crossings in the filter output with the result that the output of the zero crossing detector 607 does not exhibit exactly unity mark/space ratio. The mark/space ratio is brought to virtual unity by a time averaging divider 608 which divides by a factor of 60. The resulting square wave is converted to a sine wave in a converter circuit 609 and passed to an echo level control 313. The resulting simulated echo signal appears on lead 13.

As an example of the operation of the apparatus, consider the channel selector switch at Channel 2 and the speed switches at 1 knot. With Channel 2 selected, the carrier frequency ($f_c$) of 102 kHz is divided by 97 to give a frequency of 1052 Hz into the phase locked loop multiplier. This is multiplied in the phase locked loop multiplier circuit by 1, since the speed is set to 1 knot, to give a modulating frequency $f_m$ which is also 1052 Hz. The output of the mixer, given by the expression $(f_c \pm f_m)/2$, is then $51 \pm 0.526$ kHz. The output of the time averaging divider is $(51+0.526) \times 10^3/60 = 850 \pm 8.76$ Hz, close in value to the value calcuated above. This square wave is converted to a sine wave of the same frequency which is the echo signal.

Trigger pulse generator 620 is responsive to the channel selector switch 314 to select the appropriate frequency (representative of twice the acoustic frequency) for the trigger pulse. Under the control of the clock pulse from circuit 500 the trigger pulse is supplied on line 621 to be added to the other components of the signal in summing circuit 325.

Figure 13E:
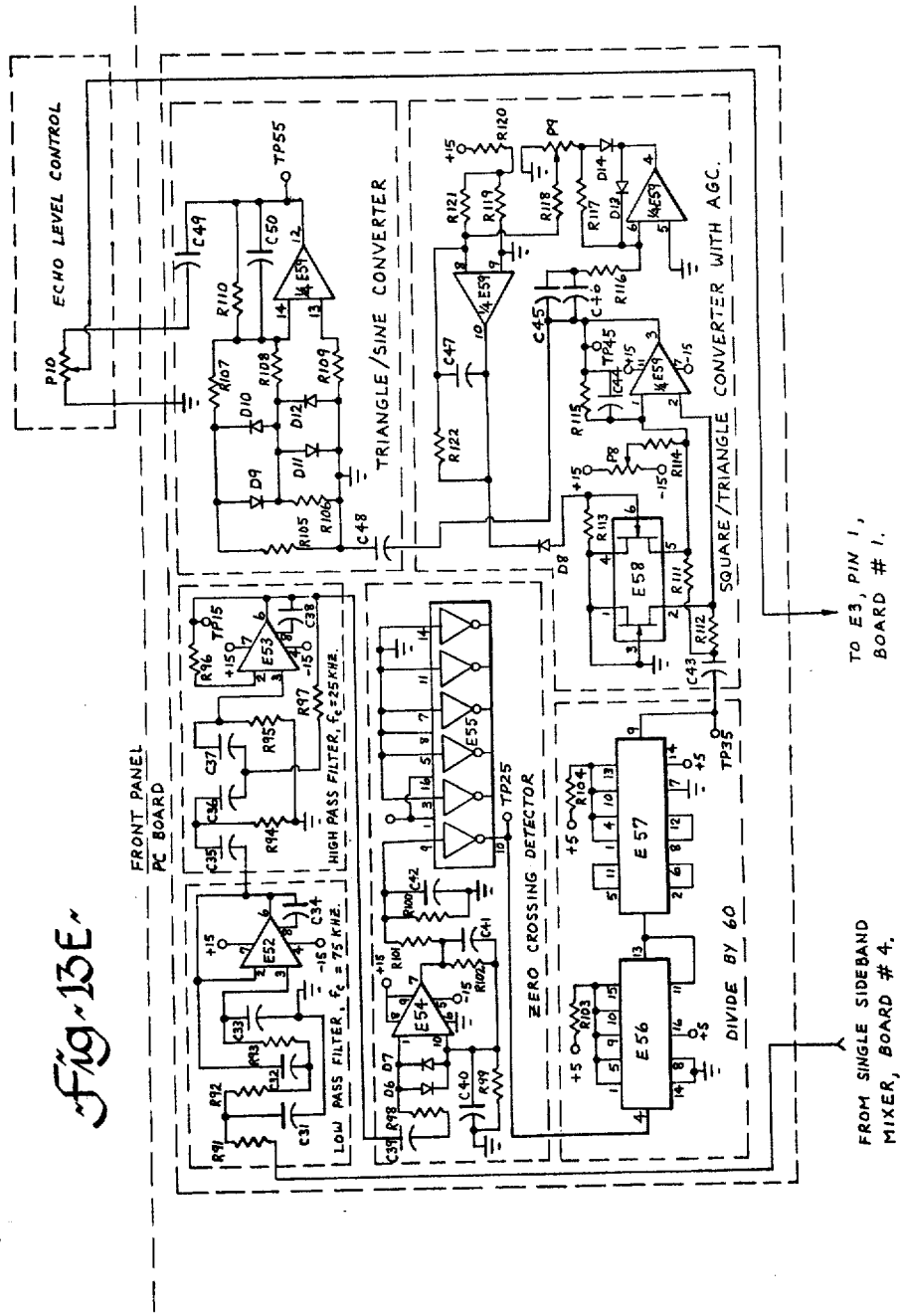
Figure 13F:
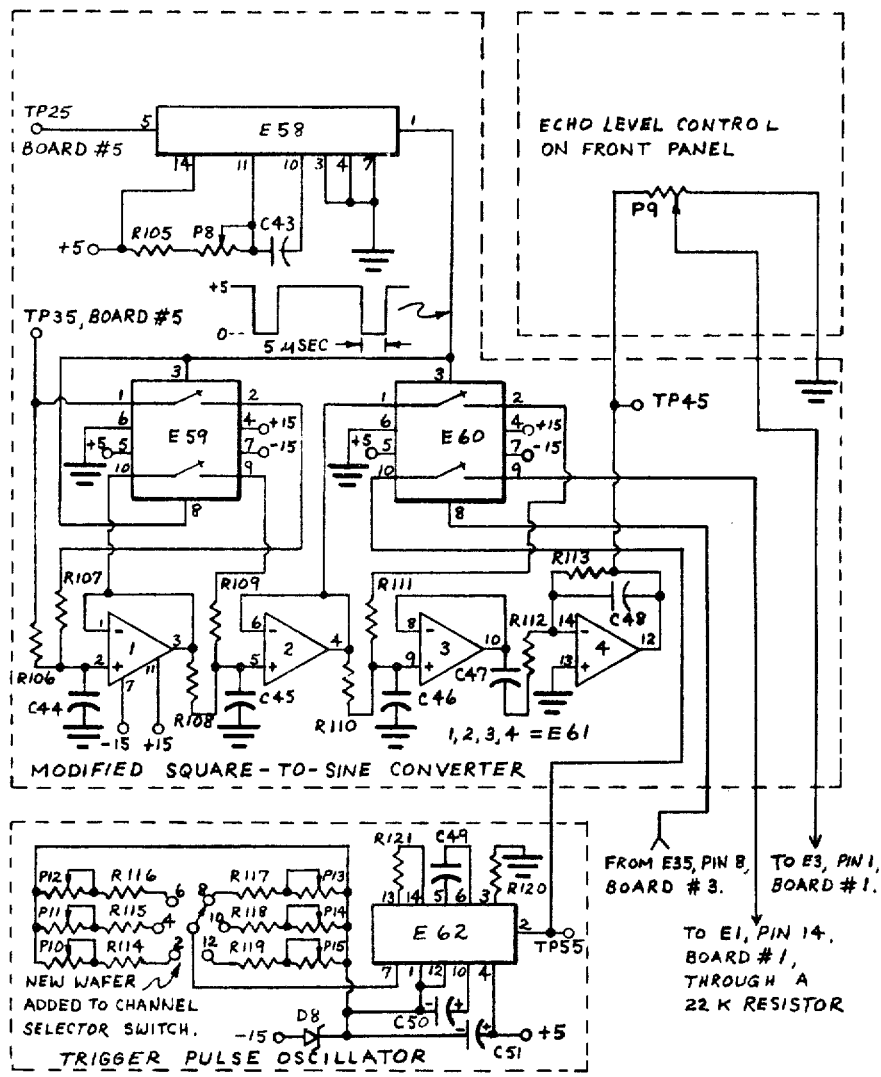

FIGS. 13(d) and 13(e) show in detail a typical echo generator constructed in accordance with the teachings of the present invention. FIG. 13(f) shows an alternative circuit providing a modified square-to-sine converter together with provisions for trigger pulse generation.

INITIAL RANGE GENERATOR

The relative position at which the echo pulse appears in the composite signal is determined by the initial range generator. The time interval, $\tau$, between acoustic transmission pulse and echo return, is twice the time it takes for the transmission to reach a target at an initial range IR, hence $$\tau = 2\left(\frac{IR}{C}\right)$$

where C is the speed of sound in water. As an example, for an initial range of 5 kyds, the echo time interval is $$\tau = 2\left(\frac{5 \times 10^3 \times 3}{5 \times 10^3}\right) = 6 \text{ sec}$$

Figure 8:
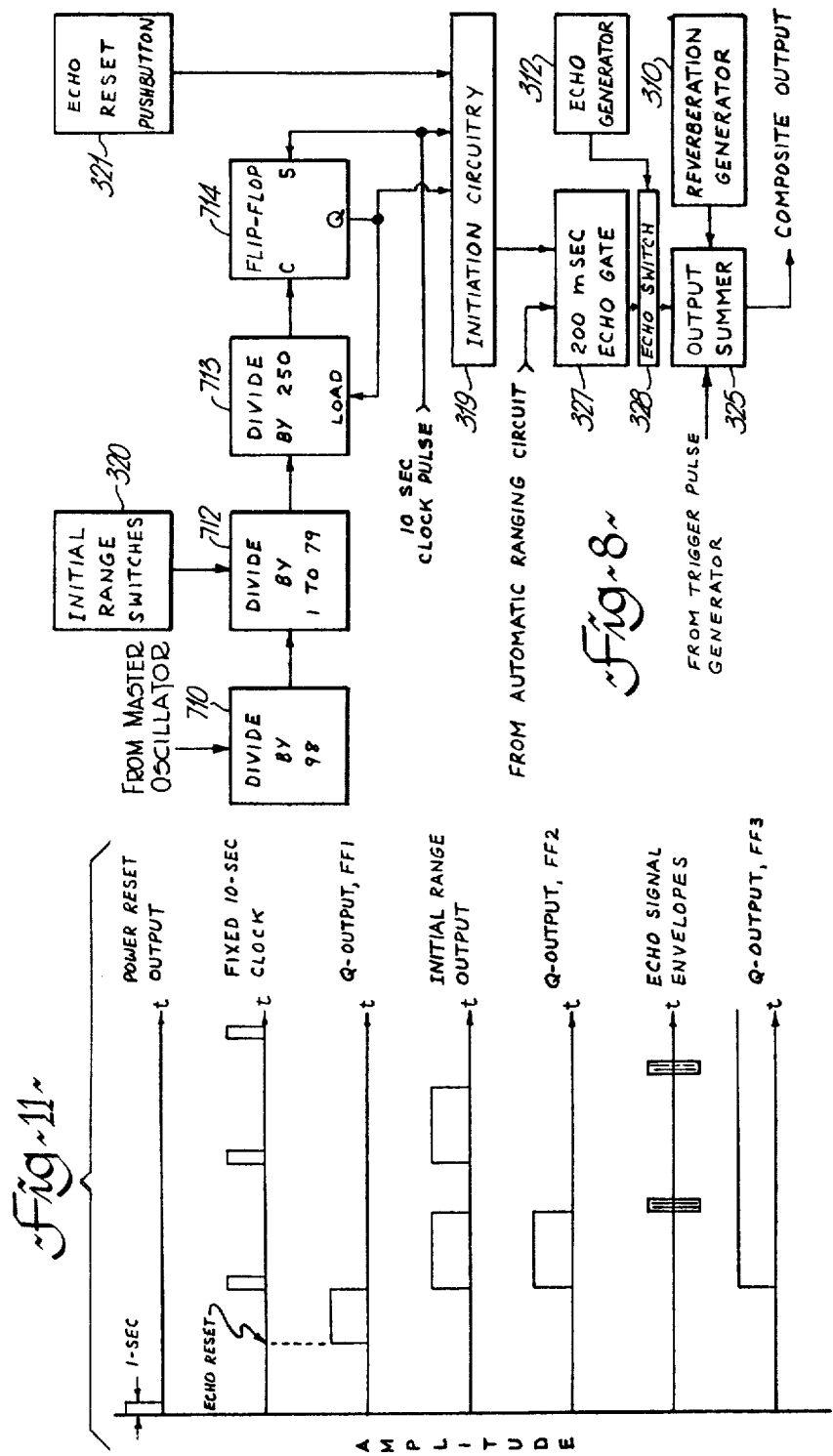
FIG. 8 is a block diagram of the initial range control section of the simulator.

A block diagram of the initial range generator is shown in FIG. 8. The function of the initial range generator is to cause the ping-to-echo time interval, $\tau$, of the first echo to correspond with the initial range setting on the front panel.

The frequency of the master oscillator signal is divided down in divider 710. Further division occurs in divider 712 with the value of the divisor depending upon the settings of initial range switches 320. The signal from divider 712 is then divided by a constant amount in divider 713 to provide a signal having a pulse period corresponding to the required delay time interval $\tau$. This signal is, in turn, used to clear flip-flop 714 giving a low output at Q. This Q output is fed both to initiation circuit 319 and fed back to divider 713 to inhibit further counting. The standard 10-second clock pulses already described are fed to the SET input of the flip-flop to reset it and thus unload the divider for the next cycle. Thus, the Q output of the flip-flop produces a pulse every 10 seconds at the correct timing for the selected initial range.

As a specific example, the master oscillator signal is divided down to a frequency of 2.082 kHz in divider 710. For an initial range of 5 kyds, the case considered in the example above, divider 712 will be dividing by 50, to produce a frequency of 41.6 Hz. This is further divided in divider 713 to produce a signal at a frequency of 0.167 Hz or a period of 6 sec, which is the value calculated in the example. At the end of count down in divider 713, its output goes low momentarily and this clears the flip-flop, making its Q output go low. This low signal is then fed back to the LOAD input of divider 713 to prevent further count down cycles. On the next 10-second clock pulse, the flip-flop becomes set. This removes the restriction from divider 713 and another count down cycle occurs. Thus, the Q output of the flip-flop produces an initial range pulse every 10 seconds.

Initiation or control circuit 319 functions to place the simulator in an idling mode as far as the echo is concerned. The operation of the circuit is described in greater detail in connection with FIG. 10. No echo appears in the output until an echo reset pushbutton 321 is pressed. If the echo reset pushbutton is pressed sometime during the 10-second clock period, the next fixed 10-second clock pulse causes the initial range pulse to appear once and only once at the output of the initiation circuit. At the end of this initial range pulse, an echo gate circuit 327 closes echo switch 328 for 200 m sec allowing the echo signal from echo generator 312 to pass to a summing circuit 325 where it is added to the reverberation component. This is the first echo. The initial range pulse appears only once at the output of the initiation circuitry and subsequent echo pulses are derived from the automatic ranging circuit.

FIG. 13(a) shows in detail a typical initial range generator constructed in accordance with this invention.

AUTOMATIC RANGING CIRCUIT

The function of the automatic ranging circuit is to control subsequent echo pulses with an echo time interval increasing or decreasing from the initial range value according to the setting of the towards/away switch and the speed switches.

Consider a target moving at velocity, V, towards or away from a sonobuoy, having an initial range, IR, at time $t=0$. The range at any time, t, is then $$R = IR \pm Vt$$

The echo time interval is $$\tau = 2R/C$$

which, after substitution for R is $$\tau = 2\left(\frac{IR}{C}\right) \pm \frac{2Vt}{C}$$

The change in echo time interval is then $$\Delta \tau = \pm \frac{2V}{C} \Delta t$$

Figure 9:
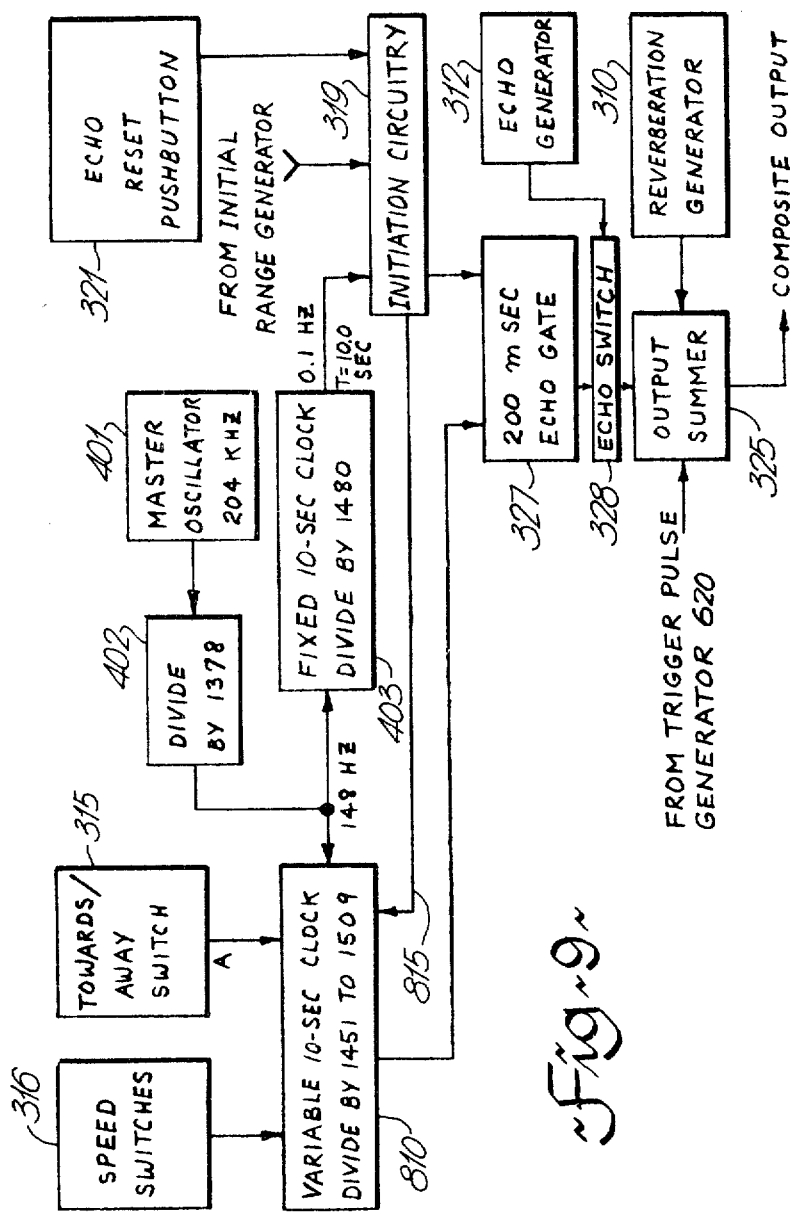
FIG. 9 is a block diagram of the simulator section which automatically varies the echo pulse characteristics in accordance with an assigned target speed and direction.

FIG. 9 shows a block diagram of the automatic ranging circuit. A variable 10-second clock circuit 810 is controlled by a signal from master oscillator 401 via divider 402. This variable clock circuit rans faster or slower than the fixed 10-second clock circuit depending upon the setting of the towards/away switch, and by amounts determined by the setting of the speed switches 316.

Initiation circuit 319 is coupled to variable clock circuit 810 by line 815 to inhibit it from counting down until the occurrence of the trailing edge of the initial range pulse. At that time, variable clock circuit 810 starts counting down and provides an output pulse after a delay close to but differing from 10 seconds by an amount dependent on the assumed speed and direction of the target.

As an example, to explain the operation of the circuit consider the case of a sampling rate of 10 sec/ping and V=1 knot (1.689 ft/sec). Then, the change in echo time interval is $$\Delta \tau = \pm \frac{2 \times 1.689}{5000} \times 10$$
$$= \pm 6.756 \ m \ \text{sec/ping}$$

For a speed setting of 1 knot and the towards/away switch in the away position, the variable 10-second clock divides by the number 1481. This is one greater than the division by 1480 in the fixed 10-second clock due to the 1 knot setting. This produces an output frequency of 0.0999325Hz having a period of 10.006757 seconds. This differs from the period of the fixed 10-second clock by 6.757 msec which is virtually identical to the calculated value. Thus, for each pulse, the echo time interval increases by $\Delta \tau = 6.757$ msec.

If a speed of 1 knot in the approaching direction had been chosen, the variable 10-second clock would be dividing by the number 1479, which is one less than the division by 1480 in the fixed 10-second clock. It is important to note that both the fixed and variable 10-second clocks are derived from the same master oscillator. This avoids problems of relative accuracy between the clocks and synchronizing problems that would arise if two independent clocks were used.

FIG. 13(g) includes circuitry for implementing a typical automatic ranging circuit constructed in accordance with the invention.

INITIATION CIRCUIT

Figure 10:
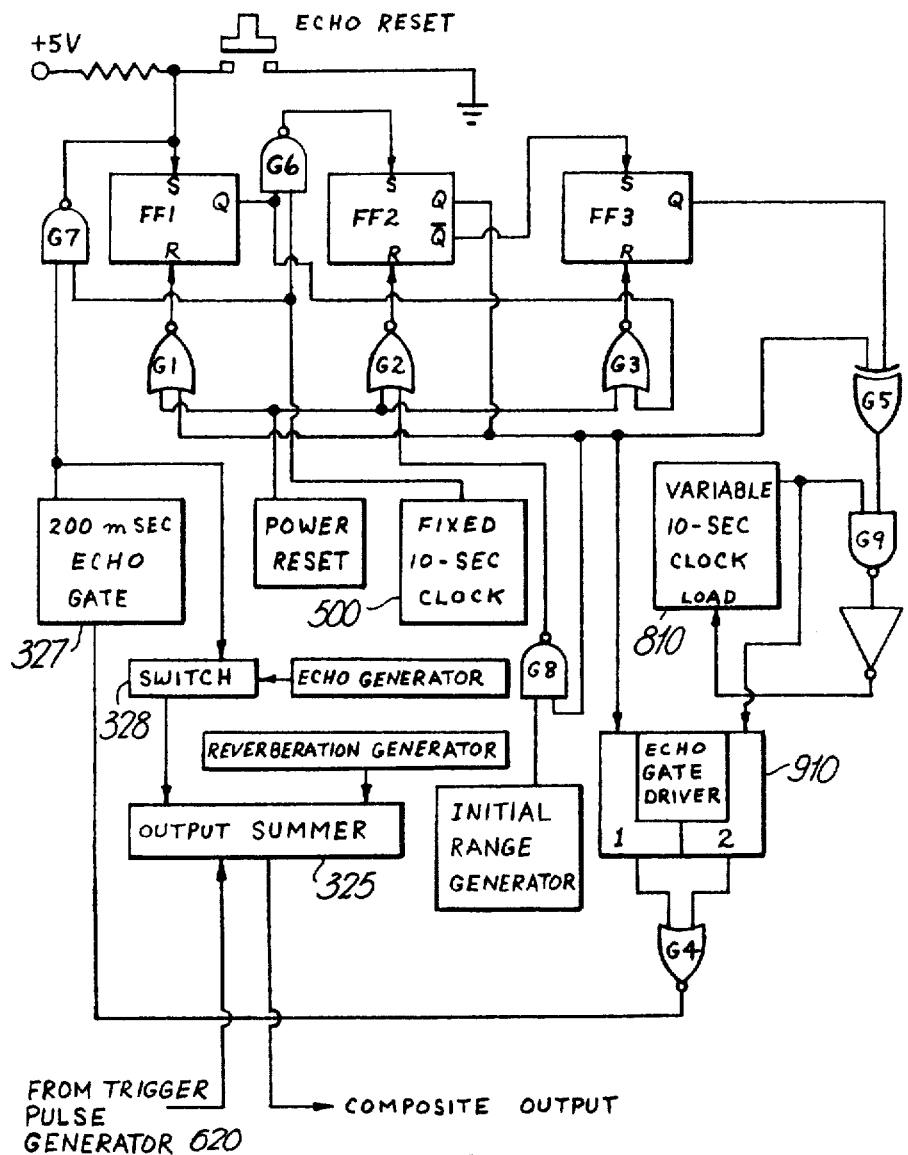
FIG. 10 is a block diagram of the control circuitry or initiation circuit of the simulator.

A block diagram of the initiation or control circuit is shown in FIG. 10. Its operation will be described with reference to the associated waveforms of FIG. 11. The truth tables of the various logic gates are shown in FIG. 12.

The initiation circuit produces initial conditions and control functions for the simulator and places the simulator in an idling mode as far as the echo is concerned. This gives the operator time to set the front panel controls to the condition he wishes to simulate.

When power is first turned on, the output of the power reset circuit goes high for approximately one second after which it goes low and the Power On indicator light on the front panel turns on. During this initial one second period, the power reset high is applied to gates G1, G2 and G3 to ensure that low is applied to the reset (R) input of each of flip-flops FF1, FF2 and FF3 which clears them (Q output low, Q output high). Also during this initial one second period, gate G5 has two lows applied to it, making its output low. Hence, a low is applied to the LOAD input of the variable 10-second clock 810 which prevents it from counting down.

At the end of this initial one second period, the lows are removed from the R inputs of FF1, FF2 and FF3. Since the other signal conditions are unchanged they remain cleared.

After a maximum of 10 seconds from power turn on, the fixed 10-second clock circuit 500 supplies pulses at 10 second intervals each of which causes the following events:

(i) The reverberation circuit produces simulated background reverberation signals, as previously described. No echo signal is added until the echo reset pushbutton is pressed.

(ii) The initial range circuit starts counting down but its output has no effect since G8 has a low applied to one of its inputs, from FF2.

When the echo reset pushbutton is pressed (assuming the initial one second period from power turn on has elapsed) FF1 is set, arming G6. The power reset circuit always applies a low to one input of G1, G2 and G3. Thus, when FF1 sets, G3 attempts to clear FF3 again, but up to now, FF3 is already clear. When the next fixed 10-second clock pulse occurs, the output of G6 goes low, setting FF2. The initial range circuit starts counting down. With FF2 set, G1 has a low and a high applied which clears FF1 again. As soon as FF2 sets, this in turn sets FF3 and these two highs from FF2 and FF3 maintain a low output from G5 and a low on the LOAD input of the variable 10-second clock in the automatic ranging circuit preventing it from counting down.

With FF2 now set and initial range counting down, G8 has 2 highs applied causing a low to be applied to G2 along with the low from power reset, which allows FF2 to continue in the set state.

As soon as initial range generator has counted down to zero, the following events occur:

(i) The initial range input to G8 goes low producing a high input to G2. This causes G2 to clear FF2 again which causes the other input to G8 to go low again. Thus, the Q output of FF2 reproduces the initial range pulse only once. This is true since with a low from the Q output of FF2 applied to one input of G8, the output of G8 will remain high regardless of the state of the initial range pulse.

(ii) When FF2 clears at the end of the initial range pulse, the falling edge of the Q output of FF2 triggers the first section (No. 1) of echo gate driver 910. This section puts out a positive going pulse which is inverted in gate G4 to trigger the 200 msec echo gate 327. This driver pulse propagates through G4 because the other input to G4 is low as a result of the second section of the echo gate driver (No. 2) not yet being triggered by the variable 10-second clock 810. For the same reason that the Q output of FF2 reproduces the initial range pulse only once, the pulse from the first section of the echo gate driver occurs only once (until after echo reset is pressed again). The output from the 200 msec echo gate 327 closes a switch 328 for 200 msec. The input to this switch is the echo signal and the first echo is added to the background reverberation signal in the output summing circuit 325. Because the pulse from the first section of the echo gate driver (No. 1) occurs only once to initiate the first echo, this input to G4 remains low after the first echo which arms G4 to trigger subsequent echoes initiated by the variable 10-second clock 810.

(iii) When FF2 clears, its input to gate G5 goes low and remains low. The other input to G5 is a high from the Q output of FF3. Hence, the output of gate G5 goes high which is applied to gate G9. The other input of G9 comes from the variable 10-second clock 810 which is normally high until the end of count down. Up to this time, the variable 10-second clock is prevented from counting by holding its LOAD input low. When the output of G9 goes low, it is inverted and removes the low from the LOAD input which starts the variable 10-second clock 810 counting down. Second and succeeding echoes are initiated each time count down is reached in the variable 10-second clock. At count down in this clock, its output goes low momentarily which triggers the second section of echo gate driver 910 whose output pulse propagates through gate G4 to trigger the 200 msec echo gate 327.

If, in time the variable 10-second clock drifts relative to the fixed 10-second clock such that the 110 msec fixed 10-second clock pulse overlaps in time with the 200 msec echo gate pulse, the output of G7 goes low during the overlap period. This automatically sets FF1 again as though echo reset had been pressed. Normally, the 110 msec fixed clock pulse will still be present when FF1 sets and this causes G6 to set FF2. FF3 remains set. Thus the procedure repeats but the first echo following overlap of the echo and fixed clock pulses, will occur at the time corresponding to the current initial range setting. This feature ensures that each echo is confined to the 10-second period following the associated interrogation pulse, thus keeping the doppler component consistent with the towards/away switch setting.

FIG. 13(g) includes circuitry for implementing a typical initiation or control circuit.

COMPONENT VALUES

Component values required to build the basic simulator, excluding the modifications of FIGS. 13(b) and 13(f) are given Table 1. For the modification shown in FIG. 13(f), the corresponding components listed in Table II can be used. The only additional component required to implement the optional 17 second ping-to-ping interval modification shown in FIG. 13(b) is a double-pole, double-throw switch used for sonobuoy mode switch 309.

TABLE I

| PARTS LIST | | | | |
|---|---|---|---|---|
| Circuit Components | | | | |
| COMPONENT | DESCRIPTION | | | |
| R1 | Resistor, | 10K, | ¼W, | 5% |
| R2 | " | 10K, | " | " |
| R3 | " | 10M, | " | " |
| R4 | " | 100K, | " | " |
| R5 | " | 100K, | " | " |
| R6 | " | 100K, | " | " |
| R7 | " | 100Ω, | " | " |
| R8 | " | 100K, | " | " |
| R9 | " | 5.6K, | " | " |
| R10 | " | 100K, | " | " |
| R11 | " | 8.2K, | " | " |
| R12 | " | 8.2K, | " | " |
| R13 | " | 18K, | " | " |

TABLE I-continued

| PARTS LIST | | | | |
|---|---|---|---|---|
| R14 | " | 18K, | " | " |
| R15 | " | 3.3K, | " | " |
| R16 | " | 4.7K, | " | " |
| R17 | " | 3.3K, | " | " |
| R18 | " | 4.7K, | " | " |
| R19 | " | 270K, | " | " |
| R20 | " | 180K, | " | " |
| R21 | " | 180K, | " | " |
| R22 | " | 150K, | " | " |
| R23 | " | 180K, | " | " |
| R24 | " | 1.5K, | " | " |
| R25 | " | 180K, | " | " |
| R26 | " | 10K, | " | " |
| R27 | " | 120K, | " | " |
| R28 | " | 68K, | " | " |
| R29 | " | 3.3K, | " | " |
| R30 | " | 3.3K, | " | " |
| R31 | " | 820Ω, | " | " |
| R32 | " | 470Ω, | " | " |
| R33 | " | 820Ω, | " | " |
| R34 | " | 470Ω, | " | " |
| R35 | " | 820Ω, | " | " |
| R36 | " | 470Ω, | " | " |
| R37 | " | 820Ω, | " | " |
| R38 | " | 470Ω, | " | " |
| R39 | " | 820Ω, | " | " |
| R40 | " | 470Ω, | " | " |
| R41 | " | 820Ω, | " | " |
| R42 | " | 470Ω, | " | " |
| R43 | " | 820Ω, | " | " |
| R44 | " | 470Ω, | " | " |
| R45 | " | 3.3K, | " | " |
| R46 | " | 3.3K, | " | " |
| R47 | " | 3.3K, | " | " |
| R48 | " | 3.3K, | " | " |
| R49 | " | 10K, | " | " |
| R50 | " | 220K, | " | " |
| R51 | " | 22Ω, | " | " |
| R52 | " | 3.3K, | " | " |
| R53 | " | 3.3K, | " | " |
| R54 | " | 100K, | " | " |
| R55 | " | 270Ω, | " | " |
| R56 | " | 10K, | " | " |
| R57 | " | 68K, | " | " |
| R58 | " | 100K, | " | " |
| R59 | " | 27K, | " | " |
| R60 | " | 10K, | " | " |
| R61 | " | 10K, | " | " |
| R62 | " | 100K, | " | " |
| R63 | " | 3.3K, | " | " |
| R64 | " | 3.3K, | " | " |
| R65 | " | 470Ω, | " | " |
| R66 | " | 820Ω, | " | " |
| R67 | " | 470Ω, | " | " |
| R68 | " | 820Ω, | " | " |
| R69 | " | 820Ω, | " | " |
| R70 | " | 470Ω, | " | " |
| R71 | " | 820Ω, | " | " |
| R72 | " | 470Ω, | " | " |
| R73 | " | 820Ω, | " | " |
| R74 | " | 470Ω, | " | " |
| R75 | " | 820Ω, | " | " |
| R76 | " | 470Ω, | " | " |
| R77 | " | 3.3K, | " | " |
| R78 | " | 10K, | " | " |
| R79 | " | 10K, | " | " |
| R80 | " | 100K, | " | " |
| R81 | " | 3.3K, | " | " |
| R82 | " | 3.3K, | " | " |
| R83 | " | 3.3K, | " | " |
| R84 | " | 3.3K, | " | " |
| R85 | " | 12K, | " | " |
| R86 | " | 22M, | " | " |
| R87 | " | 3.3K, | " | " |
| R88 | " | 3.9K, | " | " |
| R89 | " | 3.9K, | " | " |
| R90 | " | 10K, | " | " |
| R91 | " | 2.2K, | " | " |
| R92 | " | 3.9K, | " | " |
| R93 | " | 3.9K, | " | " |
| R94 | " | 15K, | " | " |

TABLE I-continued
PARTS LIST

| Ref | Type | Value | Tol | Material |
|---|---|---|---|---|
| R95 | " | 100K, | " | " |
| R96 | " | 100K, | " | " |
| R97 | " | 5.6K, | " | " |
| R98 | " | 10K, | " | " |
| R99 | " | 220Ω, | " | " |
| R100 | " | 10K, | " | " |
| R101 | " | 10K, | " | " |
| R102 | " | 1M, | " | " |
| R103 | " | 3.3K, | " | " |
| R104 | " | 3.3K, | " | " |
| R105 | " | 22K, | " | " |
| R106 | " | 56K, | " | " |
| R107 | " | 390K, | " | " |
| R108 | " | 470K, | " | " |
| R109 | " | 150K, | " | " |
| R110 | " | 470K, | " | " |
| R111 | " | 15K, | " | " |
| R112 | " | 15K, | " | " |
| R113 | " | 470K, | " | " |
| R114 | " | 1M, | " | " |
| R115 | " | 22M, | " | " |
| R116 | " | 10K, | " | " |
| R117 | " | 10K, | " | " |
| R118 | " | 3.9K, | " | " |
| R119 | " | 8.2K, | " | " |
| R120 | " | 8.2K, | " | " |
| R121 | " | 220K, | " | " |
| R122 | " | 220K, | " | " |
| C1 | Capacitor, | 4.7 | μf/35V, 20%, | Tantalum |
| C2 | " | 1 | μf/50V, " | Ceramic |
| C3 | " | 6800 | pf/100V, 10%, | " |
| C4 | " | 0.01 | μf/200V, " | " |
| C5 | " | 0.01 | μf/200V, " | " |
| C6 | " | 0.01 | μf/200V, " | " |
| C7 | " | 0.01 | μf/200V, " | " |
| C8 | " | 680 | pf/200V, " | " |
| C9 | " | 680 | pf/200V, " | " |
| C10 | " | 680 | pf/200V, " | " |
| C11 | " | 680 | pf/200V, " | " |
| C12 | " | 0.01 | μf/100V, 20%, | " |
| C13 | " | 0.47 | μf/35V, " | Tantalum |
| C14 | " | 15 | μf/35V, " | " |
| C15 | " | 0.01 | μf/50V, " | Ceramic |
| C16 | " | 0.01 | μf/50V, " | " |
| C17 | " | 2.2 | μf/20V, " | Tantalum |
| C18 | " | 0.01 | μf/50V, " | Ceramic |
| C19 | " | 0.001 | μf/200V, 10%, | " |
| C20 | " | 0.01 | μf/50V, 20%, | " |
| C21 | " | 0.01 | μf/50V, " | " |
| C22 | " | 0.01 | μf/50V, " | " |
| C23 | " | 680 | pf/200V, 10%, | " |
| C24 | " | 680 | pf/200V, " | " |
| C25 | " | 4.7 | μf/35V, 20%, | Tantalum |
| C26 | " | 100 | pf/200V, 10%, | Ceramic |
| C27 | " | 22 | pf/200V, " | " |
| C28 | " | 22 | pf/200V, " | " |
| C29 | " | 1 | μf/35V, 20%, | Tantalum |
| C30 | " | 1 | μf/35V, " | Tantalum |
| C31 | " | 820 | pf/100V, 10%, | Ceramic |
| C32 | " | 1800 | pf/100V, " | " |
| C33 | " | 82 | pf/100V, " | " |
| C34 | " | 100 | pf/100V, " | " |
| C35 | " | 270 | pf/100V, " | " |
| C36 | " | 270 | pf/100V, " | " |
| C37 | " | 270 | pf/100V, " | " |
| C38 | " | 100 | pf/100V, " | " |
| C39 | " | 4700 | pf/100V, " | " |
| C40 | " | 6800 | pf/100V, " | " |
| C41 | " | 68 | pf/200V, " | " |
| C42 | " | 330 | pf/200V, " | " |
| C43 | " | 33 | μf/10V, 20%, | Tantalum |
| C44 | " | 3300 | pf/100V, 10%, | Ceramic |
| C45 | " | 0.1 | μf/50V, 20%, | " |
| C46 | " | 0.1 | μf/50V, " | " |
| C47 | " | 6.8 | μf/35V, " | " |
| C48 | " | 0.033 | μf/100V, 10%, | " |
| C49 | " | 0.1 | μf/50V, 20%, | " |
| C50 | " | 33 | pf/100V, 10%, | " |
| D1 | Diode, | 5.1 volt zener, | | 1N751 |
| D2 | " | 5.1 volt zener, | | 1N751 |
| D3 | " | Switching diode, | | 1N914 |
| D4 | " | Switching diode, | | 1N914 |
| D5 | " | Discrete LED, red, with mounting clip. | | TO18, RL2, |
| D6 | " | Switching diode, | | 1N914 |
| D7 | " | Switching diode, | | 1N914 |
| D8 | " | Switching diode, | | 1N914 |
| D9 | " | Switching diode, | | 1N914 |
| D10 | " | Switching diode, | | 1N914 |
| D11 | " | Switching diode, | | 1N914 |
| D12 | " | Switching diode, | | 1N914 |
| D13 | " | Switching diode, | | 1N914 |
| D14 | " | Switching diode, | | 1N914 |
| E1 | Integrated Circuit, | Quad op-amp, RC4136DB | | |
| E2 | Integrated Circuit, | Multiplier, AD532KD | | |
| E3 | Integrated Circuit, | Dual SPST FET Switch DG182BA | | |
| E4 | Noise Generator, | OEI model 3350 | | |
| E5 | Integrated Circuit, | Quad op-amp, RC4136DB | | |
| E6 | Integrated Circuit, | Multiplier, AD532KD | | |
| E7 | Integrated Circuit, | Up/down Counter SN74192N | | |
| E8 | Integrated Circuit, | Up/down Counter SN74192N | | |
| E9 | Integrated Circuit, | Up/down Counter SN74192N | | |
| E10 | Integrated Circuit, | Up/down Counter SN74192N | | |
| E11 | Integrated Circuit, | Up/down Counter SN74193N | | |
| E12 | Integrated Circuit, | Up/down Counter SN74193N | | |
| E13 | Integrated Circuit, | Up/down Counter SN74193N | | |
| E14 | Integrated Circuit, | Up/down Counter, SN74193N | | |
| E15 | Integrated Circuit, | Up/down Counter, SN74193N | | |
| E16 | Integrated Circuit, | Up/down Counter, SN74193N | | |
| E17 | Integrated Circuit, | Up/down Counter, SN74193N | | |
| E18 | Integrated Circuit, | Up/down Counter, SN74193N | | |
| E19 | Integrated Circuit, | Dual Timer, RC556DB | | |
| E20 | Integrated Circuit, | Dual Flip-Flop, SN7474N | | |
| E21 | Integrated Circuit, | Dual Flip-Flop, SN7474N | | |
| E22 | Integrated Circuit, | Dual Flip-Flop, SN7474N | | |
| E23 | Integrated Circuit, | Quad Nor Gate, SN7402N | | |
| E24 | Integrated Circuit, | Quad Nand Gate, SN7400N | | |
| E25 | Integrated Circuit, | Quad Exclusive-Or Gate, SN7486N | | |
| E26 | Integrated Circuit, | Dual Timer, RC556DB | | |
| E27 | Integrated Circuit, | Dual Timer, RC556DB | | |
| E28 | Integrated Circuit, | Up/down Counter, SN74193N | | |
| E29 | Integrated Circuit, | Up/down Counter, SN74193N | | |
| E30 | Integrated Circuit, | Up/down Counter, SN74193N | | |
| E31 | Integrated Circuit, | 4-bit Binary Full Adder, SN7483AN | | |
| E32 | Integrated Circuit, | 4-bit Binary Full Adder, SN7483AN | | |
| E33 | Integrated Circuit, | 4-bit True-Complement element, SN74H87N | | |
| E34 | Integrated Circuit, | 4-bit True-Complement element, SN74H87N | | |
| E35 | Integrated Circuit, | Hex Inverter, SN7404N | | |
| E36 | Integrated Circuit, | 4-bit Binary Full Adder, SN7483AN | | |
| E37 | Integrated Circuit, | Hex Inverter, CD4009AE | | |
| E38 | Integrated Circuit, | Hex Inverter, SN7404N | | |
| E39 | Integrated Circuit, | 8-Input Nand gate, 9007DC | | |
| E40 | Integrated Circuit, | Phase Locked Loop, CD4046AD | | |
| E41 | Integrated Circuit, | Quad Nand Gate, SN7400N | | |
| E42 | Integrated Circuit, | Dual Flip-Flop, SN7474N | | |
| E43 | Integrated Circuit, | Up/down Counter, SN74193N | | |
| E44 | Integrated Circuit, | Up/down Counter, SN74193N | | |
| E45 | Integrated Circuit, | Up/down Counter, SN74193N | | |
| E46 | Integrated Circuit, | Up/down Counter, SN74193N | | |
| E47 | Integrated Circuit, | Dual Flip-Flop, SN7474N | | |
| E48 | Integrated Circuit, | Inverter, CD4007AE | | |
| E49 | Integrated Circuit, | Dual Flip-Flop, SN7474N | | |
| E50 | Integrated Circuit, | Quad Exclusive-Or Gate, SN7486N | | |
| E51 | Integrated Circuit, | Quad Exclusive-Or Gate, SN7486N | | |
| E52 | Integrated Circuit, | Operational Amplifier, NE531T | | |
| E53 | Integrated Circuit, | Operational Amplifier, NE531T | | |
| E54 | Integrated Circuit, | Comparator, AD351JH | | |
| E55 | Integrated Circuit, | Hex Inverter, CD4009AE | | |
| E56 | Integrated Circuit, | Up/down Counter, SN74193N | | |
| E57 | Integrated Circuit, | Dual Flip-Flop, SN7474N | | |
| E58 | Transistor, | Dual FET, VCR11N (Siliconix) | | |
| E59 | Integrated Circuit, | Quad op-amp, RC4136DB | | |
| X1 | Crystal, | 204.000 kHz (Snelgrove) | | |

TABLE I-continued
PARTS LIST

| | | |
|---|---|---|
| P1 | Potentiometer, | ohmite Type AB, CU1021, 1K ohms,JG |
| P2 | " | IRC Circuitrim, 450-10, 10K ± 10%, RJ12CP103 |
| P3 | " | IRC Circuitrim, 450-10, 5K ± 10%, RJ12CP502 |
| P4 | " | IRC Circuitrim, 450-10, 5K ± 10%, RJ12CP502 |
| P5 | " | IRC Circuitrim, 450-10, 1K ± 10%, RJ12CP102 |
| P6 | " | IRC Circuitrim, 450-10, 100K ± 20%, RJ12CP104 |
| P7 | " | IRC Circuitrim, 450-10, 50K ± 10%, RJ12CP503 |
| P8 | " | IRC Circuitrim, 450-10, 50K ± 10%, RJ12CP503 |
| P9 | " | IRC Circuitrim, 450-10, 10K ± 10%, RJ12CP103 |
| P10 | " | ohmite Type AB, CU1031, 10K ohms, EG |

Power Supply Decoupling Components
Board #1
(i)
Low frequency decoupling of ±15 volt and +5 volt supplies
one 47 μf/25V, 20% tantalum capacitor to each supply
(ii)
High frequency decoupling of ±15 volt and +5 volt supplies
one 0.1 μf/50V, 20% ceramic capacitor to each supply
Board #2
(i)
Low frequency decoupling of +5 volt supply
Two 10 μf/35V, 20% tantalum capacitors
(ii)
High frequency decoupling of +5 volt supply
Fourteen 0.1 μf/50V, 20% ceramic capacitors near Vcc of each IC chip.
Board #3
(i)
Low frequency decoupling of +5 volt supply
Two 10 μf/35V, 20% tantalum capacitors
(ii)
High frequency decoupling of +5 volt supply
Fifteen 0.1 μf/50V, 20% ceramic capacitors near Vcc of each IC chip.
Board #4
(i)
Low frequency decoupling of +5 volt supply
Six 10 μf/25V, electrolytic capacitors
(Sprague Cat. No. TE-1204)
(ii)
Sixteen 0.1 μf/50V, 20% ceramic capacitors near Vcc of each IC chip.
Board #5
(i)
Low frequency decoupling of ±15 volt and +5 volt supplies
Six 15 μf/35V, 20% tantalum capacitors to each supply
(ii)
High frequency decoupling of +5 volt supply
One 0.1 μf/50V, 20% ceramic capacitors near Vcc of each of IC chips E55, E56 and E57

Power Supplies
One ±15 volt supply, Analog Devices,
Model 902, F option (90–110 VAC, 50–400 Hz)
Two +5 volt supplies, Analog Devices,
Model 922, F option (90–110 VAC, 50–400 Hz)

Mechanical Parts

| DESCRIPTION | QUANTITY |
|---|---|
| IC socket, 8 pin, Augat 8058-1G51 | 3 |
| IC socket, 10 pin, Augat 8058-1G34 | 2 |
| IC socket, 14 pin DIL, Augat 514-AG10D | 27 |
| IC socket, 16 pin DIL, Augat 516-AG10D | 26 |
| Printed circuit boards (5 boards for circuits, 1 board for Power Supplies, and 1 extender board) | 7 |
| Printed circuit board guides, Birtcher 15B-10-3 | 14 |
| Printed circuit board hande, Vero Part No. 10036 | 7 |
| Printed circuit board edge connector, Cinch 50-30A-30 | 7 |
| Printed circuit board edge connector, Cinch 50-10A-20 | 4 |
| Paddle handle toggle switch, C & K 7201 J2 ZQ, with mounting hardware | 1 |
| Towards/away switch, Centralab PA-2000 Series, 2 poles/wafer, 2 poles (1 wafer required) | 1 |
| Channel selector switch, Centralab PA-2000 Series, 2 poles/wafer, 6 poles (3 wafers requires but with ¼ inch spacing between sections) | 1 |
| BCD switch, Cherry T11-02M with end caps | 4 |
| Switch, SPDT, C & K 8121 | 1 |
| Bar knobs, Rogan skokie RB-67-1-8-SK | 4 |
| BNC female bulkhead receptacle, UG-657A/U | 1 |
| Fuseholder, HKP Buss | 1 |
| Fuse, 3/2 3AG littlefuse | 1 |
| Power cable termination | |
| MALE | 1 |
| FEMALE | 1 |
| Case, Vero 1A/C5U8 | |
| Vero 1A/VMu/8/14/8A/module | 1 |
| Vero Guide rail assembly MGRA/11 | 1 |
| Vero saddle washer clearance 4112 | 36 |
| Vero saddle washer 4110 | 8 |
| Vero screw 15001 | 8 |
| Round head machine screw, 4-40, 1 inch long | 14 |

TABLE II
List of Components

| COMPONENT | DESCRIPTION |
|---|---|
| E58 | Integrated circuit, monostable multivibrator, 2N74121N |
| E59 | Integrated circuit, dual SPST FET switch, DG182BA |
| E60 | Integrated circuit, dual SPST FET switch, DG182BA |
| E61 | Integrated circuit, quad op-amp, RC4136DB |
| E62 | Integrated circuit, function generator, XR2206CP |
| R105 | Resistor, 2.7K, ¼W, 5% |
| R106 | Resistor, 100K ¼W, 5% |
| R107 | Resistor, 3.3K ¼W, 5% |
| R108 | Resistor, 100K ¼W, 5% |
| R109 | Resistor, 3.3K ¼W, 5% |
| R110 | Resistor, 100K ¼W, 5% |
| R111 | Resistor, 3.3K ¼W, 5% |
| R112 | Resistor, 10K ¼W, 5% |
| R113 | Resistor, 10K ¼W, 5% |
| R114 | Resistor, 3.57K, ¼W, 1%, metal filament |
| R115 | Resistor, 3.16K, ¼W, 1%, metal filament |
| R116 | Resistor, 2.80K, ¼W, 1%, metal filament |
| R117 | Resistor, 2.80K, ¼W, 1%, metal filament |
| R118 | Resistor, 2.49K, ¼W, 1%, metal filament |
| R119 | Resistor, 2.26K, ¼W, 1%, metal filament |
| R120 | Resistor, 18K, ¼W, 1% |
| R121 | Resistor, 220Ω ¼W, 1% |
| C43 | Capacitor, 2700 pf/100V, 10% ceramic |
| C44 | Capacitor, 0.015 μf/100V, 10% ceramic |
| C45 | Capacitor, 0.015 μf/100V, 10% ceramic |
| C46 | Capacitor, 0.015 μf/100V, 10% ceramic |
| C47 | Capacitor, 1.0 μf/50V, 20% ceramic |
| C48 | Capacitor, 3300 pf/100V, 10% ceramic |
| C49 | Capacitor, 0.01 μf/500V, 5% silvered mica |
| C50 | Capacitor, 1.0 μf/35V, 20% tantalum |
| C51 | Capacitor, 1.0 μf/35V, 20% tantalum |
| P8 | Potentiometer, 1000 ohms, Beckman 66WR1K |
| P9 | Potentiometer, 10K, ohmite type AB, CU1031 |
| P10 | Potentiometer, 500 ohms, Beckman 66WR500 |
| P11 | Potentiometer, 500 ohms, Beckman 66WR500 |
| P12 | Potentiometer, 500 ohms, Beckman 66WR500 |
| P13 | Potentiometer, 500 ohms, Beckman 66WR500 |
| P14 | Potentiometer, 500 ohsm, Beckman 66WR500 |
| P15 | Potentiometer, 500 ohms, Beckman 66WR500 |
| D8 | Diode, 10 volt zener, 1N4740A |

Power Supply Decoupling on Board #5
Decoupling capacitors on the modified board #5 are as follows:
(i)
Low frequency decoupling of +5 volt supply TABLE II-continued Six 10 μf/25V electrolytic capacitors
(Sprague Cat. No. TE-1204)
(ii)
Low frequency decoupling of ±15 volt supplies
Six 15 μf/35V, 20% tantalum capacitors to each supply.
(iii)
High frequency decoupling to +5 and ±15 volt supplies
One 0.1 μf/50V, 20% ceramic capacitor near each Vcc of each IC chip. (Total = 19 capacitors)

I claim:

1. A sonobuoy signal simulator comprising:
   means for producing a train of simulated reverberation signals;
   means for setting representative range, speed, and direction signals for a target,
   means responsive to said range, speed and direction signals for providing a train of simulated echo pulses each echo pulse being respectively associated with a reverberation signal in said train of reverberation signals;
   means responsive to said speed and direction signals for automatically and uniformly varying the time between the start of a reverberation signal of said train of reverberation signals and the start of an associated echo pulse of said train of echo pulses as succeeding sets of a reverberation signal and an associated echo pulses occur; and,
   summing means for combining said train of reverberation signals and said train of echo pulses.

2. A simulator according to claim 1 further including means for producing a trigger pulse signal and supplying said trigger pulse signal to said summing means.

3. A simulator according to claim 1 wherein said means for producing a train of simulated reverberation signals comprises:
   a source of clock pulses,
   an integrator having its input coupled to a variable d.c. source and adapted to be reset by each of said clock pulses,
   a squaring circuit coupled to the output of said integrator to produce a control signal, and
   a voltage controlled bandpass filter having a random noise generator connected to its input, said filter being responsive to said control signal to vary its band-pass characteristics and to produce the simulated reverberation signals at its output.

4. A simulator according to claim 1 wherein said means for providing a train of simulated echo pulses comprises:
   a reference signal source producing a reference signal,
   means for frequency dividing said reference signal to produce a first signal representative of a selected frequency for said train of echo pulses,
   multiplying means responsive to said first signal and said signal representative of target speed to provide a second signal representative of the product of target speed and said selected frequency,
   modulating means for mixing said reference signal and said second signal and extracting a sideband signal therefrom in accordance with said direction signal, and
   frequency dividing means responsive to said sideband signal to produce said train of simulated echo pulses.

5. A simulator according to claim 1 further including gating means controlling the occurrence of said echo pulses said gating means being controlled by a variable delay pulse generator and a sequence pulse generator.

6. A simulator according to claim 5 wherein said variable delay pulse generator comprises:
   a source of reference pulses,
   controllable divider means connected to said source of reference pulses and having a divisor value selected by switch means to be representative of the range of the target,
   a pulse generating circuit responsive to the output of said controllable divider means to produce an output pulse after a selected delay, said simulator further comprising:
   a manually actuated control circuit coupled to said pulse generating circuit and adapted on actuation to cause passage of only the first occurring output pulse from said pulse generating circuit after such actuation,
   said gating means being responsive to the pulses passing from said control circuit to provide an echo pulse of predetermined duration and frequency.

7. A simulator according to claim 6 wherein said sequence pulse generator is part of said means for varying and provides a sequence of output pulses spaced by a uniformly varying time interval, the initial pulse being derived from said pulse generating circuit, the sequence pulse generator including:
   controllable divider means having a divisor value selected by said means representative of speed and direction and being connected to said source of reference pulses,
   said divider means being inhibited until the occurrence of said echo pulse.

8. A circuit for producing a simulated echo signal received from a target moving at a selected speed and direction interrogated by a pulse of selected frequency comprising:
   a reference signal source producing a reference signal,
   means for frequency dividing said reference signal to produce a first signal representative of said selected frequency of the pulse,
   means for providing a second signal representative of target speed,
   multiplying means responsive to said first and second signals to provide a third signal representative of the product of target speed and said selected frequency,
   means for producing a fourth signal representative of target direction,
   modulating means mixing said reference signal and said third signal and extracting a sideband signal therefrom under control of said fourth signal, and
   frequency dividing means responsive to said sideband signal to produce said simulated echo signal.

9. A circuit for producing a simulated reverberation signal comprising:
   a source of clock pulses,
   means providing a variable voltage,
   an integrator having its input coupled to the output of said means for providing a variable voltage and adapted to integrate a voltage applied at its input and to be reset by each of said clock pulses,
   a squaring circuit coupled to the output of said integrator to produce a control signal, and a voltage controlled bandpass filter having a random noise generator connected to its input and responsive to said control signal to produce a simulated reverberation signal at its output.

10. A sonobuoy signal simulator comprising:

means for producing a train of simulated reverberation signals, means for setting target representative range, speed and direction signals, means responsive to said range, speed and direction signals for providing a train of simulated echo pulses, and summing means for combining said train of reverberation signals and said train of echo pulses, said means for producing a train of simulated reverberation signals comprising:

a source of clock pulses, an integrator having its input coupled to a variable d.c. source and adapted to be reset by each of said clock pulses, a squaring circuit coupled to the output of said integrator to produce a control signal, and a voltage controlled bandpass filter having a random noise generator connected to its input, said filter being responsive to said control signal to vary its band-pass characteristics and to produce the simulated reverberation signals at its output.

11. A sonobuoy signal simulator comprising:

means for producing a train of simulated reverberation signals, means for setting target representative range, speed and direction signals, means responsive to said range, speed and direction signals for providing a train of simulated echo pulses, and summing means for combining said train of reverberation signals and said train of echo pulses, said means for providing a train of simulated echo pulses comprising:

a reference signal source producing a reference signal, means for frequency dividing said reference signal to produce a first signal representative of a selected frequency for said train of echo pulses, multiplying means responsive to said first signal and said signal representative of target speed to provide a second signal representative of the product of target speed and said selected frequency, modulating means for mixing said reference signal and said second signal and extracting a sideband signal therefrom in accordance with said direction signal, and frequency dividing means responsive to said sideband signal to produce said train of simulated echo pulses.

12. A sonobuoy signal simulator comprising:

means for producing a train of simulated reverberation signals, means for setting target representative range, speed and direction signals, means responsive to said range, speed and direction signals for providing a train of simulated echo pulses, summing means for combining said train of reverberation signals and said train of echo pulses, and gating means controlling the occurrence of said echo pulses said gating means being controlled by a variable delay pulse generator and a sequence pulse generator, said variable delay pulse generator comprising:

a source of reference pulses, controllable divider means connected to said source of reference pulses and having a divisor value selected by switch means to be representative of the range of the target, a pulse generating circuit responsive to the output of said controllable divider means to produce an output pulse after a selected delay, said simulator further comprising:

a manually actuated control circuit coupled to said pulse generating circuit and adapted on actuation to cause passage of only the first occurring output pulse from said pulse generating circuit after such actuation, said gating means being responsive to the pulse passing from said control circuit to provide an echo pulse of predetermined duration and frequency.

13. A simulator according to claim 12 wherein said sequence pulse generator provides a sequence of output pulses spaced by a uniformly varying time interval, the initial pulse being derived from said pulse generating circuit, the sequence pulse generator including:

controllable divider means having a divisor value selected by said means representative of target speed and direction and being connected to said source of reference pulses, said divider means being inhibited until the occurrence of said echo pulse.

* * * * *